United States Patent [19]
Medendorp

[11] 3,843,019

[45] Oct. 22, 1974

[54] DENESTING APPARATUS

[75] Inventor: Roger L. Medendorp, Grand Rapids, Mich.

[73] Assignee: Kirkhof Manufacturing Corporation, Grand Rapids, Mich.

[22] Filed: Aug. 21, 1972

[21] Appl. No.: 282,326

[52] U.S. Cl................ 221/225, 221/301, 221/297, 221/210, 221/236
[51] Int. Cl............................................ B65h 5/00
[58] Field of Search........... 221/289, 292, 293, 294, 221/297, 301, 181, 224, 225, 236, 238, 251, 210, 215, 219, 220; 271/41, 58–63; 214/8.5 K

[56] References Cited
UNITED STATES PATENTS

| | | | |
|---|---|---|---|
| 637,316 | 11/1899 | Woodland | 221/210 |
| 1,690,920 | 11/1929 | Bergmann et al. | 214/8.5 K |
| 2,015,913 | 10/1935 | Vonsydow et al. | 221/293 |
| 2,692,691 | 10/1954 | Harriss et al. | 214/8.5 K |
| 3,091,362 | 5/1963 | Robinson | 221/225 |
| 3,460,415 | 8/1969 | Philipp | 221/219 |
| 3,572,690 | 3/1971 | Lillie | 271/61 |

FOREIGN PATENTS OR APPLICATIONS

| | | | |
|---|---|---|---|
| 831,771 | 3/1960 | Great Britain | 221/297 |

*Primary Examiner*—Robert B. Reeves
*Assistant Examiner*—H. Grant Skaggs
*Attorney, Agent, or Firm*—Price, Heneveld, Huizenga & Cooper

[57] ABSTRACT

A denesting apparatus includes an open-ended vertical storage hopper in which is placed a plurality of lightweight trays or the like which are desired to be individually and sequentially unloaded through an open bottom of the hopper. First holding fingers mounted adjacent each side of the bottom of the hopper are sequentially actuated to separate individual trays from the stack of trays in the hopper and release the tray as it is gripped by a pair of gripping fingers mounted on a carriage assembly which reciprocates between the bottom of the tray-holding hopper and a work surface below. The carriage assembly is mechanically coupled to the actuation means for the holding fingers to insure timed sequential operation of the fingers in transferring a separated tray and the gripping fingers which control the movement of the relatively lightweight tray as it is removed from the stack of trays and lowered to the work surface. One finger of the second pair of fingers is actuated to release the tray at the lower travel limit of the carriage assembly.

24 Claims, 9 Drawing Figures

1
DENESTING APPARATUS

BACKGROUND OF THE INVENTION

The present invention relates to a denesting apparatus and particularly to an apparatus for use in separating individual lightweight trays from a stack of such trays.

In packaging products in relatively thin and lightweight trays, it is necessary to position the tray in some suitable manner to receive the product held by the tray. Trays made of thin plastic material are relatively fragile and require careful handling during the packaging process. To complicate the problems encountered in using such trays, they are usually received in stacks of interengaging trays, stacked one upon the other, to conserve space in shipping the trays from the manufacturer to the user of the trays. Thus, it is necessary to individually separate the trays from the stack of trays as well as position them in location to receive a product.

The use of relatively thin and lightweight plastic trays for packaging of bread is a relatively new idea and has posed significant problems related to removing the trays from the stack of trays and positioning the tray to receive a loaf of sliced bread. In packaging installations where the trays are vertically stacked, it is desired to remove trays from the bottom of the stack. It is not possible, however, to separate the bottom tray of the stack and allow it to vertically drop into position since the trays are very lightweight and tend to rotate, twist, or otherwise lose the desired orientation when freely falling in air. It is also not possible to separate the bottom tray from a vertical stack of such trays and allow it to fall within vertical guide means such as vertical columns since the one edge of the tray frequently will catch on one of the columns and cause the tray to turn over or otherwise move out of position by the time it has reached the lowered position. Also, it is difficult to time the positioning of a free falling tray such that rapid packaging requiring synchronized positioning of a tray and insertion of bread can be achieved.

Thus, it is necessary to provide controlled movement of the tray after separating the bottom tray from the stack of vertically oriented trays. The controlled movement is necessary both to control the speed at which the tray is positioned so as to properly time the packaging operation by insuring that an empty tray is in position to receive a loaf of sliced bread as the bread becomes available for packaging and as to the guiding of the tray's position so as to insure the loaf of sliced bread is properly inserted into the tray.

SUMMARY OF THE INVENTION

The apparatus of the present invention provides the necessary denesting of the stack of trays by providing an upper tray-holding finger assembly which selectively releases a single tray in timed relationship with gripping fingers mounted on a carriage assembly which reciprocates between an upper position whereupon it receives a separated tray from the first tray-holding fingers and a lowered position whereupon it releases the tray oriented in a predetermined manner. In this manner, therefore, the tray is held by the gripping fingers during its vertical movement downward from the stack of trays and onto a work surface.

The apparatus embodying the present invention includes a carriage assembly reciprocating between an upper and a lower position and including thereon a pair of fingers for gripping the edge of a tray actuated to release the tray when the carriage assembly is in the lowered position. An upper tray-holding finger assembly includes a pair of holding fingers on each side of the tray stack. Camming means are provided for alternately reciprocating upper and lower fingers of each pair of holding fingers in a manner to separate a tray and release it in timed relationship to the upper travel limit of the carriage assembly so as to transfer a separated tray to gripping fingers on the carriage assembly whereupon it can be lowered into position and released.

It is an object, therefore, of the present invention to provide a denesting apparatus for removing individual articles from a stack of such articles.

It is an additional object of the present invention to provide an apparatus for sequentially removing a bottom article from an elevated vertical stack of relatively lightweight articles and control the motion of the article so removed to position it at a predetermined lowered position.

It is still a further object of the present invention to provide a reciprocating, releasable article-gripping finger assembly for controlling the motion of an article that has been separated from a stack of such articles to a predetermined position.

Another object of the present invention is to provide holding fingers located at the bottom of a vertical hopper holding a plurality of relatively thin lightweight trays and which are cammed to sequentially separate the bottom tray from the plurality of stacked trays in timed relationship with a reciprocating tray-gripping finger assembly which receives the separated tray therefrom and controls the motion of the separated tray to a predetermined location.

These and other objects of the present invention will become apparent upon reading the following specification together with the drawings.

DETAILED DESCRIPTION OF THE PREFERRED EMBODIMENT

Figure 1:
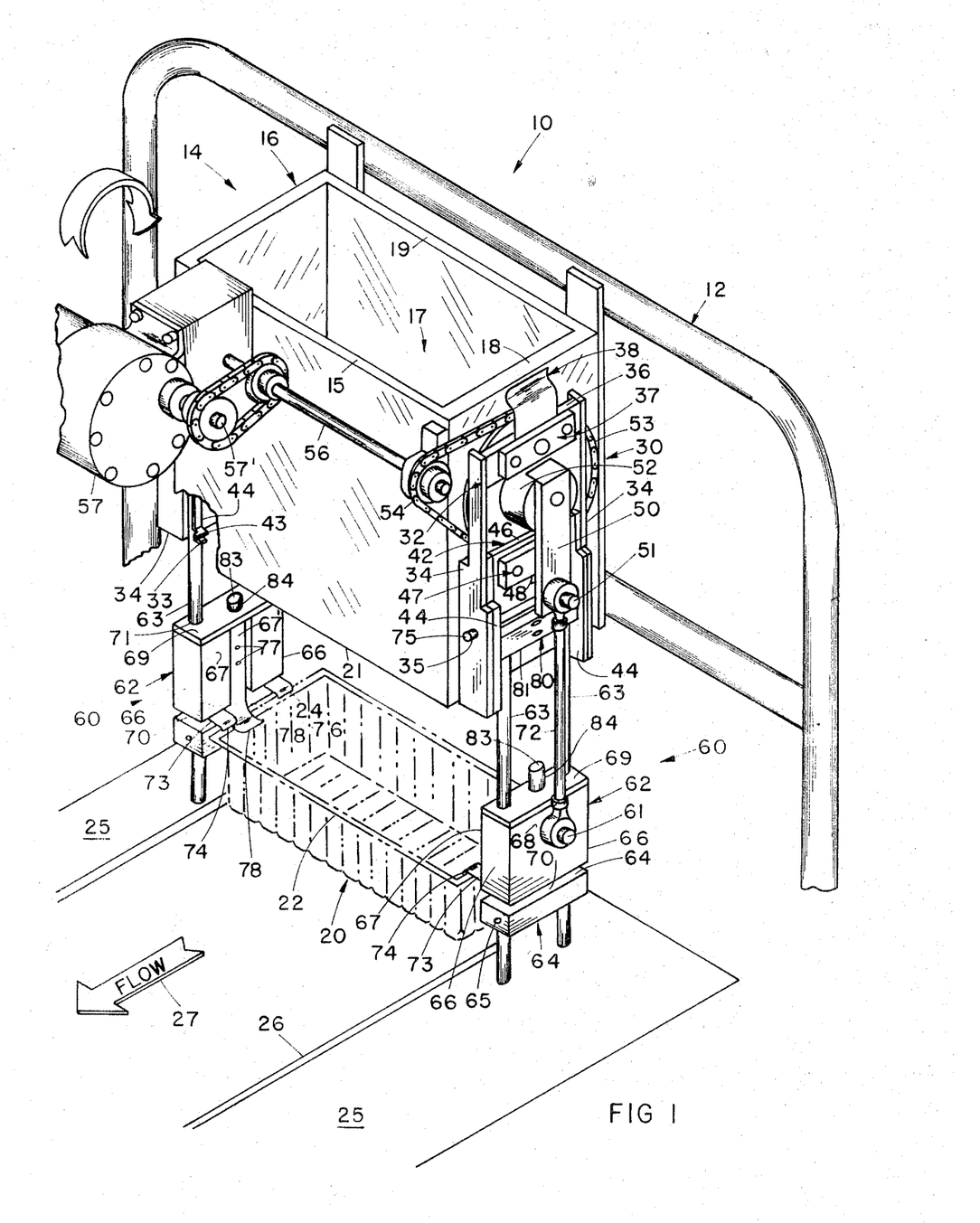
FIG. 1 is a perspective view of a denesting apparatus of the present invention.
Figure 1A:
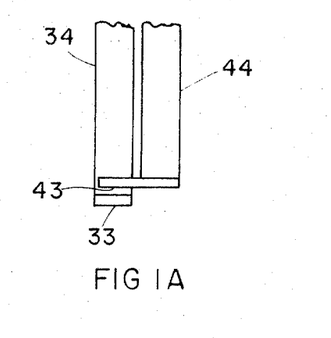
FIG. 1A is a detailed elevation view of one pair of the tray-holding fingers shown in FIG. 1.
Figure 2:
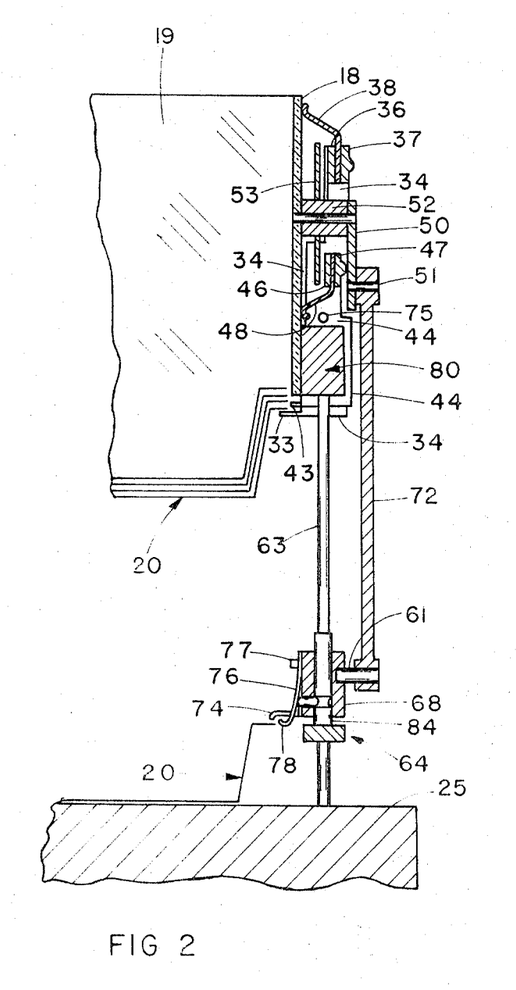
FIG. 2 is a sectional view taken along section lines II—II of FIG. 1.

Referring now in detail to FIGS. 1, 1A, and 2, there is shown a denesting apparatus 10 which comprises a framework assembly 12 to which is coupled article-retaining means such as a hopper 14. The hopper 14 comprises a pair of end plates 16 and 18 joined by side plates 15 and 19 to form a generally rectangular central opening 17 in which is placed a plurality of stacked articles such as relatively thin plastic trays 20. Each tray 20 includes an outwardly projecting edge 22 around its periphery.

In accordance with the operation of the apparatus 10, the stack of trays 20 are held within the hopper 14 and the bottom tray of the stack is selectively removed from a bottom opening 21 of hopper 14 and lowered onto a work surface 25. The work surface may include a conveyor belt 26 movable in the direction indicated in the arrow 27 to transport the lowered tray to a packaging area.

To provide the denesting, a pair of separating, upper holding finger assemblies 30 on sides 16 and 18 are employed to hold the trays within the hopper 14 and selectively separate the bottom tray from the stack of trays. In addition to the pair of separating, upper holding finger assemblies 30, a pair of gripping finger assemblies 60 on each side reciprocate between the bottom 21 of the hopper 14 and the work surface 25. A separated tray 20 is releaseably held between the gripping finger assemblies 60 to control the motion of the tray from the hopper to the work surface. A detailed description of the assemblies 30 and 60 follows.

One separating assembly 30 is mounted on each end plate 16 and 18. The assemblies 30 are identical so that a description of the one on right plate 18 serves to describe both. The assembly 30 comprises a first U-shaped frame 32 having a cross member 36 with a pair of downwardly depending legs 34 attached to each end. A first, lower pair of fingers 33 are mounted at the ends of each leg 34 of the frame 32 and project inwardly toward the opening 17 of the hopper 14. The U-shaped frame 32 is pivotally attached to a mounting block 80 secured to the end plates 18 by means of a pivot pin 75 extending through the apertures 35 in each leg 34 of the frame. Apertures 35 are somewhat larger than the diameter of pin 75 to allow rotation of the frame about pin 75.

The inwardly projecting fingers 33 on each leg 34 of the U-shaped frame 32 are normally held in an inward position by means of a leaf bias spring 38 which pivots the frame 32 about the pin 75 to cause the fingers 33 to project inwardly. The cross member 36 of the frame 32 includes a ball cam follower assembly 37 on a side of the frame opposite the bias spring. The assembly 37 is periodically contacted by a rotating actuation arm 50 thereby causing the inwardly projecting fingers 33 to be momentarily moved outwardly as the cross member of frame 32 moves inwardly toward the end plate 18 and frame 32 pivots about pin 75.

Actuation arm 50 is mounted to a drum 52 rotatably mounted to end plate 18 and coupled to a sprocket 53. Sprocket 53 is coupled to a second sprocket 54 mounted on an axle 56 by means of a chain 55 extending therebetween. A drive motor 57, is mounted to the frame 12 and has a rotating shaft 57' coupled to the axle 56 by means of a pair of sprockets 58 (one on each of the shaft and axle) coupled together by a chain 59. The axle 56 extends to each of the end plates 16 and 18 to drive an identical sprocket 53 and rotating drum 52 and assembly 30 associated with the end plate 16 but not shown in detail in the figure.

The separating or holding finger assembly 30 additionally includes a second U-shaped frame 42 having a cross member 46 and downwardly depending legs 44. Coupled to the end of the legs 44 is a pair of inwardly projecting second, or upper fingers 43 which as seen in FIG. 1A, are positioned in vertical alignment with but spaced above the fingers 33 of the first frame 32. The cross member of frame 42 is somewhat shorter than cross member 36 of frame 32 such that the second frame can fit between the legs of the first frame. Frame 42 is similarly pivotally mounted about the pin 75 by means of a pair of apertures (not shown) through the legs 44 such that the fingers 43 associated therewith can be reciprocated inwardly and outwardly between tray-holding and tray-releasing positions respectively.

The second frame 42 also includes a ball cam follower assembly 47 identical to the corresponding ball cam follower assembly 37 on the first frame. The second frame similarly includes a bias spring 48 adapted to hold the fingers 43 in their inward position when the rotating actuating arm 50 is not in contact with the ball cam follower 47. It is seen, therefore, that as the actuation arm 50 rotates through 360°, the fingers 33 and 43 which are positioned at each end of each of the legs forming the frames 32 and 42, of the left and right assemblies 30 are alternately and momentarily reciprocated outwardly and then returned to their spring biased inward positions. As explained below, the reciprocation of these eight fingers (33, 43) provides the separation of an individual tray from the stack of trays in the hopper 14 and selectively releases a separated tray to the gripping finger assemblies 60.

As used herein, separation of an article by the separating means 30 is defined as positioning a barrier between the end article and the next end article in the stack and releasing the end article for movement away from the stack. With some articles, the separated article may be free to drop or move from the stack once this separation has taken place. With articles which stick together however, additional means such as gripping means causes the actual physical separation of the separated end article from the stack. In the preferred embodiment for example, the actual physical separation of the end tray is accomplished by the gripping finger assemblies 60 after the vertically spaced fingers 33 and 43 (spaced to correspond to the approximate vertical spacing between the edges 22 of trays 20 when stacked) have separated or isolated a tray from the stack. The structure of the lower gripping finger assembly 60 which permits the grasping of a tray, the carrying of the tray to the work surface 25, and the releasing of the tray is now described.

The left and right gripping assemblies 60 are identical and shown in a lowered position adjacent work surface 25 in FIG. 1. Each gripping assembly 60 comprises a generally rectangular and hollow carriage assembly 62 slidably mounted on a pair of vertical shafts 63 which extend between the mounting block 80 and the surface 25. A stop 64 is secured to the shafts 63 at the bottom travel limit of the carriage 62 by means of a pair of set screws 65.

Each of the carriage assemblies 62 comprise a pair of end walls 66, inner and outer side walls 67 and 68 respectively, a top plate 69, and a bottom plate 70. The inner side walls 67 include a central recess 67' which extend between the top and bottom surfaces. A pair of apertures 71 in each of the top plates 69 and a correspondingly aligned pair of apertures (not shown) in the bottom plates 70 permit the passage of the shafts 63 through the carriage assemblies 62. These apertures 71 are sufficiently large to permit the carriage assemblies 62 to freely slide on the shafts 63. In some embodiments, suitable sleeve bushings are mounted in each of the apertures to insure ease of motion of the carriage assemblies 62 on the shafts 63.

Each carriage assembly 62 is coupled to a corresponding actuation arm 50 by means of a crank arm 72 pivotally coupled to the end of the actuation arm 50 by means of coupling 51 and pivotally coupled to the outer wall 68 of the carriage 62 by means of a coupling 61. Thus, as the actuation arm 50 rotates, the carriage 62 will reciprocate between the lowered position shown in FIG. 1 and an upper position in which the top plate 69 of the carriage is immediately under and adjacent a bottom surface 81 of the mounting block 80.

A pair of fixed fingers 73 with downwardly bent ends 74 are mounted to the bottom plates 70 of each carriage 62. The fingers 73 are spaced apart so as not to interfere with fingers 33 and 43 of the assemblies 30 when carriages 60 are in the upward position. Fingers 73 are sufficiently long to project inwardly into the hopper opening 71 such that as the carriages 62 reciprocate to the upward position, the ends 74 of the fingers 73 will snap over the edges 22 of a tray 20.

In addition to the pair of fixed fingers 73, each of the carriage assemblies 62 include a single movable finger 76 having an upwardly curved end 78. Fingers 76 are mounted in the recesses 67' of carriages 62 and anchored to the inner walls 67 by means of a pair of screws 77. Each movable finger 76 is made of a stiffly springable material such as spring steel.

Figure 4A:
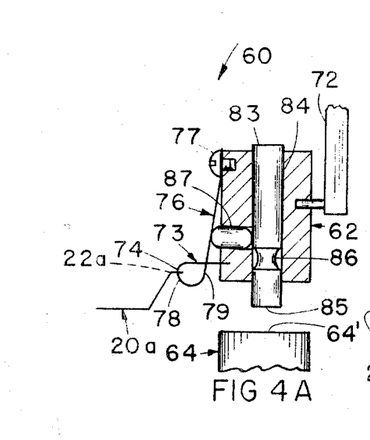
FIGS. 4A through 4C are schematic diagrams showing the lower tray-gripping finger assembly in the positions which correspond to the same portion of the cycle of operation of the apparatus as the correspondingly lettered FIGS. 3A through 3C.
Figures 4B, 4C:
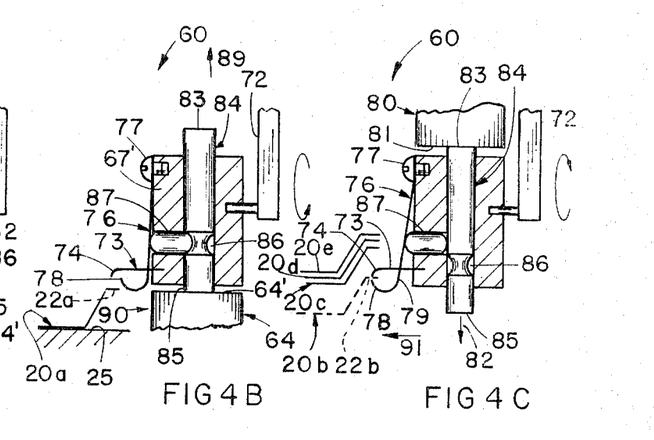

Referring now to FIGS. 1 and 4, each movable finger 76 is actuated by means of a camshaft 84 which includes an annular groove 86 therein (FIG. 4) which is adapted to receive a ball cam follower 87 mounted to an outer surface 79 of the finger 76. The inner wall 67 of each carriage 62 has an opening (not shown) located within the area of recess 67' which allows the ball cam follower 87 to communicate with the interior of the carriage 62 and cam shaft 84. Cam shaft 84 is held in a vertically slidable position relative to the carriage 62 by means of an aperture 88 within the top plate 69 of each carriage, and a correspondingly aligned aperture (not shown) in the bottom plate 70. The apertures in the top and bottom plate are sized to allow shaft 84 to freely reciprocate in a vertical direction while providing guided support to the shaft. The pressure of the ball cam follower 87 against shaft 84 due to the spring force of fingers 76 in an outward direction is sufficient to retain the shaft within the carriage 62. In some embodiments, stops such as C-clips could be provided at each end of each shaft 84 to insure they remain positioned within the carriage.

Figures 3A, 3B:
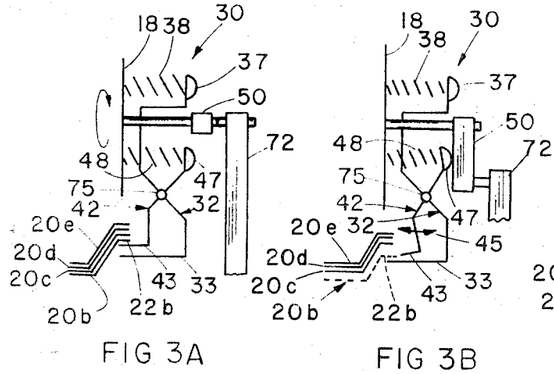
FIGS. 3A through 3C are schematic diagrams showing the upper tray-holding finger assembly in three positions during a cycle of operation of the apparatus shown in FIG. 1.

As the carriages 62 are reciprocated on shafts 63, the bottom 85 of cam shaft 84 will contact the top surface 64' of the stop 64 and thereby be pushed upwardly to a position shown in FIG. 3B whereby the ball cam follower 87 will fit within the annular groove 86 of cam 84 allowing the fingers 76 to move outwardly (away from central opening 17 of hopper 14) under their spring tension thereby releasing the edge 22 of tray 20. Thus, when the gripping finger assembly 60 is in its lowered position, the tray 20 will be released on the work surface 25 since the movable fingers 76, which support the tray at its lower surface, are moved outwardly.

As the gripping finger assemblies 60 move to the uppermost position, the movable fingers 76 are reset to their inward position as the top 83 of the cam shaft 84 contacts the lower surface 81 of the mounting block 80 (as shown in FIG. 4C), and is pushed downwardly. In this position, the ball cam follower 71 is forced out of the annular groove 86 in shaft 84 and the movable finger 76 is forced inwardly toward the center of the hopper in a tray-gripping position.

Figure 3C:
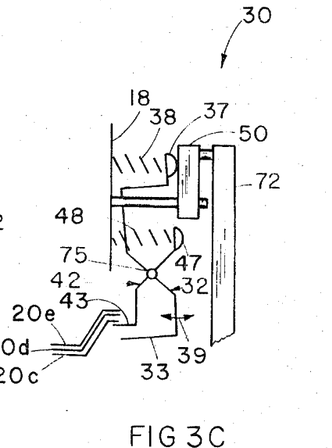

The description of a cycle of operation of the denesting apparatus 10 is best understood by referring to the FIGS. 3A through 3C and 4A through 4C. FIGS. 3A and 4A correspond to the holding finger assembly 30 on the right side of apparatus 10 and the right side gripping finger assembly 60 shown in the position of an operating cycle in which the carriage assembly 62 is moving downwardly but has not yet reached the lowermost position. At this time, the actuation arm 50 is contacting neither of the cam followers 37 or 47 of the frames 32 and 42 respectively. FIGS. 3B and 4B correspond to the positions of the upper holding finger assembly 30 and gripping finger assembly 60 in which the carriage assembly 62 is in its bottommost position and about to move upwardly. FIGS. 3C and 4C illustrate the portion of the operating cycle whereupon the carriage assembly 62 is in its uppermost position and is about to move downwardly.

Referring now to FIGS. 3A and 4A, it is seen that the stack of trays including the trays 20b through 20e, are supported in the hopper 14 by means of the inwardly projecting holding finger 43 which contacts the lower surface of the edge 22b of this lowermost tray of the stack. Neither of the fingers 33 or 43 are being actuated by the arm 50 and therefore are in their spring-biased inward positions. It is understood that the trays are supported on the opposite side of the hopper by an identical assembly attached to wall 16. In some embodiments however, a single assembly on one side wall will suffice. Tray 20a is held by the downwardly moving carriage assembly 60 by the edge 74 of upper finger 73 which contacts the top surface of the edge 22a of tray 20a and the edge 78 of the movable finger 76 which is inwardly positioned by means of the cam 84 pushing against the ball cam follower 87. Thus, the motion of tray 20a is being controlled by the pair of gripping finger assemblies 60 on each side of the tray. The tray 20a is held in a stable position by the pair of fixed fingers 73 between which extends the movable finger 76 thereby clamping the edge 22a of the tray 20a between the three fingers on each side of the tray.

As the carriage assemblies 62 reach the lowermost position, the finger 43 associated with the frame assembly 42 is moved outwardly momentarily as shown in FIG. 3B and indicated by arrow 45 to allow the stack of trays to move downwardly an incremental amount under the gravitational field. As the trays drop, they are positioned against and supported by the movable fingers 33 on each side of the tray. At the same time, the bottom end 85 of the cam 84 is contacting the top surface 64' of the stop 64 and thereby being forced upwardly (as shown by the arrow 89) which allows the movable finger 76 to spring outwardly as the cam follower 87 snaps into the annular groove 86 in cam 84. The movement of the movable finger 76 outwardly (shown by arrow 90) releases the edge 22a of the tray 20a and allows the tray, which has its bottom surface in contact with the work surface 25 at this time, to be released onto the work surface. As the cycle continues, the finger 43 which reciprocated outwardly momentarily to allow the stack of trays to shift downward, moves inwardly again thereby fitting between the edge 22b of the bottommost tray and edge 22c of the adjacent tray 20c stacked above tray 20b and effecting separation of tray 20b from the stack. The edge 22 b of tray 20b is now positioned between fingers 43 and 33.

As the actuation arm 50 continues rotating, the carriage assembly 62 continues upwardly reaching the bottom of the hopper 14, the fixed fingers 73 on each of the carriage assemblies snap over the edge 22b of the bottommost tray 22b so as to be positioned between the trays 20b and 20c as shown in FIG. 4C. The downwardly depending edge 74 of the fingers 73 aids in allowing these fingers to snap over the edge without damaging the tray. It is noted here that the stack of trays 20c through 20d shown in FIGS. 3C and 4C are actually one stack of trays, the mechanism being shown separately in the two figures for the sake of clarity. It is understood, however, that the carriage assemblies 62 are immediately under and adjacent the holding finger assemblies 30 in the uppermost position. The fingers 33 and 43 are spaced apart a sufficient amount to allow the fixed and movable fingers 73 and 76 respectively of each carriage assembly to move into position within the lower hopper area so as not to interfere with their grasping of the edge of the lowermost tray when the carriage assemblies are in their top position.

Continuing now with the description, as the carriage assembly 62 reaches the uppermost position, the top surface 83 of the cam 84 contacts the lower surface 81 of the mounting block 80 thereby forcing the cam 84 in a downward direction indicated by the arrow 82 shown in FIG. 4C. The cam movement pushes the movable fingers 76 inwardly as indicated by arrow 91 such that its end 78 contacts the lower surface of the edge 22b of tray 20b thereby gripping the tray edge 22b between the fingers. At substantially the same time, the actuation arm 50 is contacting the ball cam follower 37 of the first frame assembly 32 which reciprocates the finger 33 outward momentarily as indicated by the arrow 39 associated with finger 33 in FIG. 3C, thereby releasing the bottommost tray 20b to allow the downward travel of the tray which is now gripped between the fingers 33 and 43 of carriage assembly 62. As the carriage assembly 62 begins its downward motion, the actuating arm 50 clears the ball cam follower 37 and the finger 33 moves inwardly again to the position shown in FIG. 2A.

The cycle is then repeated to sequentially remove the trays from the hopper 14 at a speed determined by the rotational speed of the shaft 56 (FIG. 1) which can be set to pace the tray unloading operation with packaging or other operations. It is noted that the sequence of the operation of each of the fingers is synchronized by the actuation arm 50 coupled to the carriage assembly 62 and by the spacing of the stops 64 and mounting blocks 80 with respect to the cams 84.

In some embodiments where an article can freely drop or move from a stack of articles, the gripping means including the carriage assembly may not be required; it being only necessary to sequentially separate an article from the stack in timed relationship to some other process. Also, as the invention is used for separating articles other than the trays described herein the particular holding finger design on the separating means or gripping finger design on the gripping means (if needed) may be varied to accommodate the particular article. Also, the retaining means may take forms other than a hopper and could, for example, be horizontally oriented guides holding articles in a predetermined position. These and other modifications to the apparatus embodying this invention may be made by those skilled in the art without departing from the spirit or scope of the invention as defined by the appended claims.

The embodiments of the invention in which an exclusive property or privilege is claimed are defined as follows.

1. An apparatus for sequentially removing an article from a stack of articles and for controlling its motion to a location remote from the stack comprising:

retainer means for retaining a plurality of stacked articles in a predetermined orientation;

separating means for selectively separating an end article from said stack of articles;

movable holding means positioned adjacent said separating means and movable between article holding and article releasing positions for selectively holding and releasing a separated end article;

a pair of carriage means positioned on opposite sides of said retaining means and movable between said retainer means and a predetermined location remote therefrom;

gripping means coupled to each of said carriage means and movable therewith for alternately gripping and releasing opposite sides of a separated article; and means coupling said carriage means to said separating and holding means to synchronize the movement of said gripping means with said separating and holding means.

2. The apparatus as defined in claim 1 wherein said retaining means comprises a hopper having an article receiving central opening therein.

3. An apparatus for sequentially removing an article from a stack of articles and for controlling its motion to a location remote from the stack comprising:

a hopper having an article receiving central opening therein for retaining a plurality of stacked articles in a predetermined orientation;

separating means comprising first and second fingers projecting inwardly toward said central opening of said hopper and pivotally coupled thereto to allow outward motion of said fingers for selectively separating an end article from said stack of articles;

a pair of carriage means positioned on opposite sides of said retaining means and movable between said retainer means and a predetermined location remote therefrom;

gripping means coupled to each of said carriage means and movable therewith for alternately gripping and releasing opposite sides of a separated article; and means coupling said carriage means to said separating means to synchronize the movement of said gripping means with said separating means.

4. The apparatus as defined in claim 3 and further including actuation means for alternately reciprocating said first and second fingers in a manner to separate an end tray from the stack of trays.

5. The apparatus as defined in claim 4 wherein said gripping means includes at least one fixed finger and at least one movable finger projecting inwardly toward said central opening and camming means for moving said movable finger to grip an article between said fixed and movable fingers when said carriage means is positioned adjacent said hopper and for moving said movable finger to release said article when said carriage means is positioned at said remote predetermined location.

6. The apparatus as defined in claim 5 wherein said actuation means is coupled to said carriage means to synchronize the movement of said first and second fingers with said movable finger of said gripping means.

7. An apparatus for sequentially removing lightweight trays from a vertical stack of such trays fitted one within another comprising:
means for retaining a stack of trays in substantially vertical relationship;
separating means coupled to said retaining means for sequentially separating an end tray from the stack of trays to permit removal of the end tray from the stack;
movable holding means positioned adjacent said separating means and movable between article holding and article releasing positions for selectively holding and releasing a separated end article; and
reciprocating gripping means movable between said retaining means and a position below and remote therefrom for gripping an end tray released by said holding means, carrying said end tray to a lowered position remote from said retaining means and releasing said end tray, and returning to said holding means to receive the next separated end tray.

8. The apparatus as defined in claim 7 wherein said retaining means comprises: a vertical hopper having a central, tray receiving opening therein for holding said trays in vertical alignment.

9. The apparatus as defined in claim 8 wherein said separating means includes a plurality of inwardly extending holding fingers coupled to the bottom of said hopper for holding said stack of trays in said hopper, and actuatable for sequentially releasing the bottom tray of the stack.

10. An apparatus for sequentially removing lightweight trays from a vertical stack of such trays fitted one within another comprising:
means for retaining a stack of trays comprising a vertical hopper having a central, tray receiving opening therein for holding said trays in vertical alignment;
separating means coupled to said retaining means for sequentially separating an end tray from the stack of trays to permit removal of the end tray from the stack wherein said separating means includes at least one pivotable frame pivotally coupled to said hopper for coupling a plurality of inwardly extending holding fingers coupled to the bottom of said hopper for holding said stack of trays in said hopper;
means for pivoting said frame a rotating actuation arm periodically contacting one side of said frame causing said frame to pivot in a manner to move said holding fingers outwardly to sequentially release said stack of trays bias means contacting the other side of said frame for pivoting said frame causing said holding fingers to move inwardly for holding said stack of trays; and reciprocating gripping means movable between said retaining means and a position below and remote therefrom for gripping an end tray released by said separating means, carrying said end tray to a lowered position remote from said retaining means and releasing said end tray, and returning to said holding means to receive the next separated end tray.

11. The apparatus as defined in claim 10 wherein said reciprocating gripping means comprises a carriage assembly movably mounted between said bottom of said hopper and a position remote therefrom and including a plurality of inwardly extending gripping fingers including at least one of which is movable to alternately grip and release a tray.

12. The apparatus as defined in claim 11 wherein said carriage assembly includes camming means coupled to said movable gripping finger for actuating said finger to grip a released tray at the bottom of said hopper and release said tray when said carriage has moved to said remote position.

13. The apparatus as defined in claim 12 and further including means coupling said actuation arm to said carriage assembly to synchronize the movement of said holding fingers and said movable gripping finger.

14. The apparatus as defined in claim 13 wherein said separating means further includes a second plurality of inwardly extending fingers coupled to said hopper by means of a second frame pivotally coupled to opposite sides of said hopper and positioned to be actuated by said actuation arm such that said second holding fingers are moved in said first direction when said actuation arm is 180° from its contact position with said first frame, said second frame including biasing means holding said second holding fingers in a normally inward tray holding position, said first and second tray holding fingers being vertically spaced so as to separate an end tray from said stack of trays as said fingers are alternately actuated while simultaneously holding said next end tray.

15. A denesting apparatus for separating a tray from a stack of trays and for positioning the separated tray onto a work surface comprising: a hopper for retaining a plurality of frays stacked one upon the other; holding finger means for holding the trays in the hopper, and sequentially separating one tray from the stack of trays in said hopper; said holding finger means comprising first and second holding fingers spaced apart a predetermined distance and movable to sequentially hold and separate an end tray from said hopper; a carriage assembly reciprocally mounted between said hopper and a work surface; gripping fingers mounted to said carriage assembly and including at least one movable finger for gripping said separated tray thereby carrying said tray between said hopper and said work surface as said carriage assembly travels therebetween; and means for moving said movable gripping finger to release said tray when said carriage assembly is in a predetermined position.

16. The apparatus as defined in claim 15 including actuating means for alternately reciprocating said first and second holding fingers toward and away from a tray.

17. The apparatus as defined in claim 16 and further including means for coupling said carriage assembly to said actuating means to synchronize the motion of said first and second holding fingers with said carriage assembly motion.

18. The apparatus as defined in claim 17 wherein said moving means includes a cam movably mounted to said carriage assembly and in contact with said at least one movable gripping finger to selectively move said finger into a gripping or releasing position.

19. The apparatus as defined in claim 18 and further including stop means mounted to said apparatus at alternate ends of travel of said carriage assembly and positioned to shift said cam to a first position when said carriage assembly is in a first position thereby moving said movable gripping finger into a gripping position, and to shift said cam to a second position when said carriage assembly is in said predetermined position thereby moving said movable gripping finger into a releasing position.

20. The apparatus as defined in claim 19 wherein said gripping fingers include at least one fixed finger positioned in spaced relationship to said movable finger to grip an edge of a tray between said fixed and movable fingers when said movable finger is in said gripping position.

21. The apparatus as defined in claim 20 wherein said hopper is positioned to hold a stack of trays in vertical alignment, wherein a pair of first and second holding fingers are mounted at opposite sides of said hopper, and wherein a pair of carriage assemblies each including gripping fingers are mounted at the same opposite sides of said hopper such that a tray is contacted at opposite edges by fingers on opposite sides of said hopper.

22. A denesting apparatus for separating an article from a stack of articles and for positioning the separated article onto a work surface comprising: a hopper for retaining a plurality of articles stacked one adjacent the other; means for holding the articles in the hopper, and sequentially separating and releasing one article from the stack of articles in said hopper; guide means extending between said hopper and a work surface; a carriage assembly slidably mounted to said guide means for movement between said hopper and a work surface; gripping means mounted to said carriage assembly and including at least one movable member for gripping said separated article thereby carrying said article between said hopper and said work surface as said carriage assembly travels therebetween; stop means mounted to said guide means near an end thereof adjacent said work surface; and camming means coupled to said gripping means and actuated by contacting said stop means when said carriage approaches the work surface for directly moving said movable gripping member to release said article when said carriage assembly is in a predetermined position with respect to the work surface.

23. The apparatus as defined in claim 22 wherein said hopper includes stop means thereon and wherein said camming means engages said stop when said carriage approaches said hopper to actuate said movable gripping member to grip an article separated by said holding means.

24. The apparatus as defined in claim 23 wherein said camming means comprises a sliding member movably mounted to said carriage and including opposite end portions alternately extending from said carriage to engage the work surface or said stop means to move said sliding member, and means coupling said sliding member to said movable gripping member to move said gripping member between gripping and releasing positions as said sliding member is moved with respect to said carriage.

* * * * *

UNITED STATES PATENT OFFICE
CERTIFICATE OF CORRECTION

Patent No. 3,843,019    Dated October 22, 1974

Inventor(s) Roger L. Medendorp

It is certified that error appears in the above-identified patent and that said Letters Patent are hereby corrected as shown below:

Column 10, line 38:

"frays" should be --- trays ---.

Signed and sealed this 11th day of February 1975.

(SEAL)
Attest:

RUTH C. MASON
Attesting Officer

C. MARSHALL DANN
Commissioner of Patents
and Trademarks